United States Patent
Shaw

(10) Patent No.: US 6,538,364 B1
(45) Date of Patent: Mar. 25, 2003

(54) LIGHT DIFFUSING COATING FOR EXTERIOR BULB SURFACES

(75) Inventor: Cathy M. Shaw, Manchester, MA (US)

(73) Assignee: Osram Sylvania Inc., Danvers, MA (US)

( * ) Notice: Subject to any disclaimer, the term of this patent is extended or adjusted under 35 U.S.C. 154(b) by 0 days.

(21) Appl. No.: 09/407,272

(22) Filed: Sep. 29, 1999

(51) Int. Cl.$^7$ ............................. H01K 1/32; H01J 9/20
(52) U.S. Cl. .................. 313/112; 313/489; 313/635; 428/241; 428/402; 428/403; 428/406; 427/58; 252/582
(58) Field of Search .............................. 313/110, 116, 313/635, 112, 479, 480, 489; 428/241, 375, 384, 387, 388, 391, 402, 404, 403, 406; 427/58; 445/14, 58; 252/582, 586, 589

(56) References Cited

U.S. PATENT DOCUMENTS

| | | | |
|---|---|---|---|
| 2,661,438 A | * | 12/1953 | Shand .......................... 313/116 |
| 2,859,369 A | | 11/1958 | Williams et al. ............. 313/113 |
| 2,963,611 A | | 12/1960 | Meister et al. ............... 313/116 |
| 4,441,047 A | * | 4/1984 | Collins et al. ............... 313/116 |
| 5,036,244 A | | 7/1991 | Shaffer ......................... 313/116 |
| 5,328,975 A | | 7/1994 | Hanson et al. ................. 528/29 |
| 5,410,212 A | | 4/1995 | Reisman ....................... 313/116 |
| 5,674,624 A | * | 10/1997 | Miyazaki et al. ............. 428/422 |
| 5,834,551 A | * | 11/1998 | Haraguchi et al. ........... 524/492 |
| 6,017,389 A | * | 1/2000 | Schmidt ..................... 106/287.1 |

FOREIGN PATENT DOCUMENTS

| | | | |
|---|---|---|---|
| EP | 0 176 345 A1 | 4/1986 | ............ C03C/17/23 |

OTHER PUBLICATIONS

Shaw, *Characterization of the Philips Sol–Gel Frost Process*, Measurement Report MR96–R/LMS0024–CH, Osram Sylvania Inc. Mar. 18, 1996.

Hinz. et al., *Anti–Reflecting Light–Scattering Coatings Via the Sol–Gel Procedure*, J. Non–Cryst. Solids, 82 (1986) pp. 411–416.

* cited by examiner

*Primary Examiner*—Ashok Patel
(74) *Attorney, Agent, or Firm*—Robert F. Clark

(57) ABSTRACT

A light diffusing coating for use on the exterior surfaces of the glass envelopes of electric lamps. The light diffusing coating containing a bimodal distribution of fine and ultrafine silica scattering centers which are adhered to each other and the glass surface by a sol gel derived silica.

25 Claims, 3 Drawing Sheets

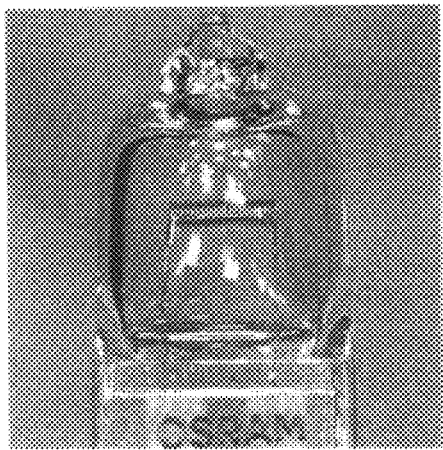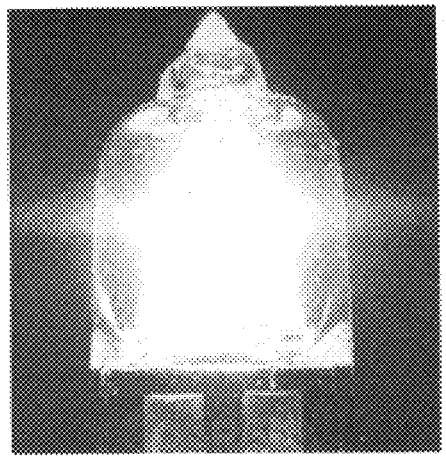
*FIG. 3A*  *FIG. 3B*
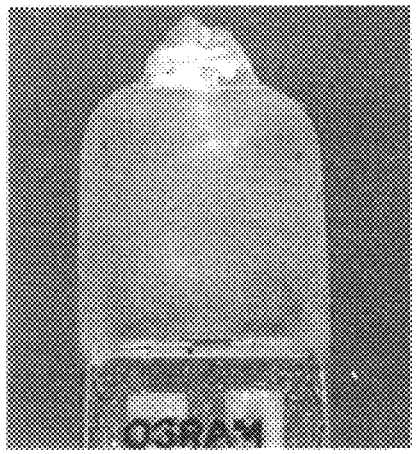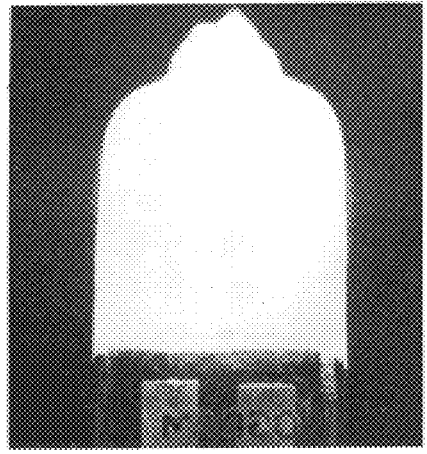
*FIG. 3C*  *FIG. 3D*

LIGHT DIFFUSING COATING FOR EXTERIOR BULB SURFACES

TECHNICAL FIELD

The present invention relates to a light diffusing coating which is applied to the exterior surface of the glass bulbs of electric lamps and in particular tungsten halogen incandescent lamps.

BACKGROUND OF THE INVENTION

Light diffusing coatings are used in incandescent lighting applications to reduce glare from the hot filament and produce a softer, more even illumination. Typically, the coating is applied to the interior surface of the lamp envelope. However, in some lamp applications, it is preferable to have the coating on the exterior of the lamp, e.g., tungsten halogen lamps. Such coatings must be uniform and diffuse the light without effecting a substantial loss in lumen output. In particular, it is desirable that the loss in luminous flux be less than about 10%. The coating must have sufficient mechanical strength to prevent damage during handling and lamp operation and should not adversely impact lamp life. It is also desirable that the coating process be compatible with conventional manufacturing techniques to keep costs low.

One well known light diffusing coating is composed of fumed silica (silica "smoke"). Fumed silica typically is formed by flame hydrolysis of silicon tetrachloride and is composed of extremely fine particles of silica having a diameter less than about 100 nm. The silica "smoke" is adhered to the inner bulb surface by an electrostatic attraction between the glass surface and the silica particles. However, silica "smoke" coatings are not suitable for use on exterior bulb surfaces since they lack sufficient mechanical strength and are degraded by moisture.

Another well known method of providing light diffusion is acid etching or "frosting" of the surface of the glass bulb with hydrofluoric acid (HF). While HF frosting provides an effective light diffusing surface, there are drawbacks associated with this method which limit its use. Particularly, the acid etching adversely affects bulb strength and the use of hydrofluoric acid raises important environmental, health and safety concerns.

An alternative to HF frosting is sandblasting which can produce an appearance similar to frosted bulbs without the problems which accompany the use of hydrofluoric acid. Sandblasting causes the formation of fractured regions (defects) on the glass surface which act as light scattering centers. However, sandblasting also diminishes bulb strength and introduces contaminates which promote devitrification of the glass during operation. This is a particular problem at the high bulb temperatures observed in operating tungsten halogen lamps. Furthermore, methods which result in diminished bulb strength are not desirable for tungsten halogen lamps which have operating pressures of several atmospheres.

Hence, it would be an advantage to have a durable, light diffusing coating which could be applied to an exterior bulb surface without diminishing the strength of the bulb.

SUMMARY OF THE INVENTION

It is an object of the invention to obviate the disadvantages of the prior art.

It is another object of the invention to provide a durable, light diffusing coating for use on the exterior surfaces of the glass envelopes of electric lamps.

It is a further object of the invention to provide a coating solution for applying a durable, light diffusing coating to an electric lamp and a method for applying the coating solution which is compatible with conventional lamp manufacturing techniques.

In accordance with one aspect of the invention, there is provided a light diffusing coating for an electric lamp having a glass bulb comprising: fine silica particles having an average diameter of from about 0.5 to about 4 micrometers and ultrafine silica particles having an average diameter of from about 10 to about 100 nanometers; the fine and ultrafine silica particles being adhered to the glass bulb by a sol gel derived silica.

In accordance with another aspect of the invention, there is provided a sol gel coating solution for forming a light diffusing coating on an electric lamp comprising: fine silica particles having an average diameter of from about 0.5 to about 4 micrometers and ultrafine silica particles having an average diameter of from about 10 to about 100 nanometers, said silica particles being suspended in an alcoholic solution of tetraethoxysiliane and diethoxydimethylsilane.

In accordance with yet another aspect of the invention, there is provided an electric lamp having a filament, lead wires, and a glass envelope; the glass envelope containing the filament and having a light diffusing coating on an exterior surface; the filament being connected to the lead wires and connectable to an external source of electrical energy; the light diffusing coating comprising: fine silica particles having an average diameter of from about 0.5 to about 4 micrometers and ultrafine silica particles having an average diameter of from about 10 to about 100 nanometers; the fine and ultrafine silica particles being adhered to the glass envelope by a sol gel derived silica.

BRIEF DESCRIPTION OF THE DRAWINGS

FIGS. 3A–3D are a progression of photographs demonstrating the light diffusing properties of the light diffusing coating of the present invention.

DESCRIPTION OF THE PREFERRED EMBODIMENTS

Figure 1:
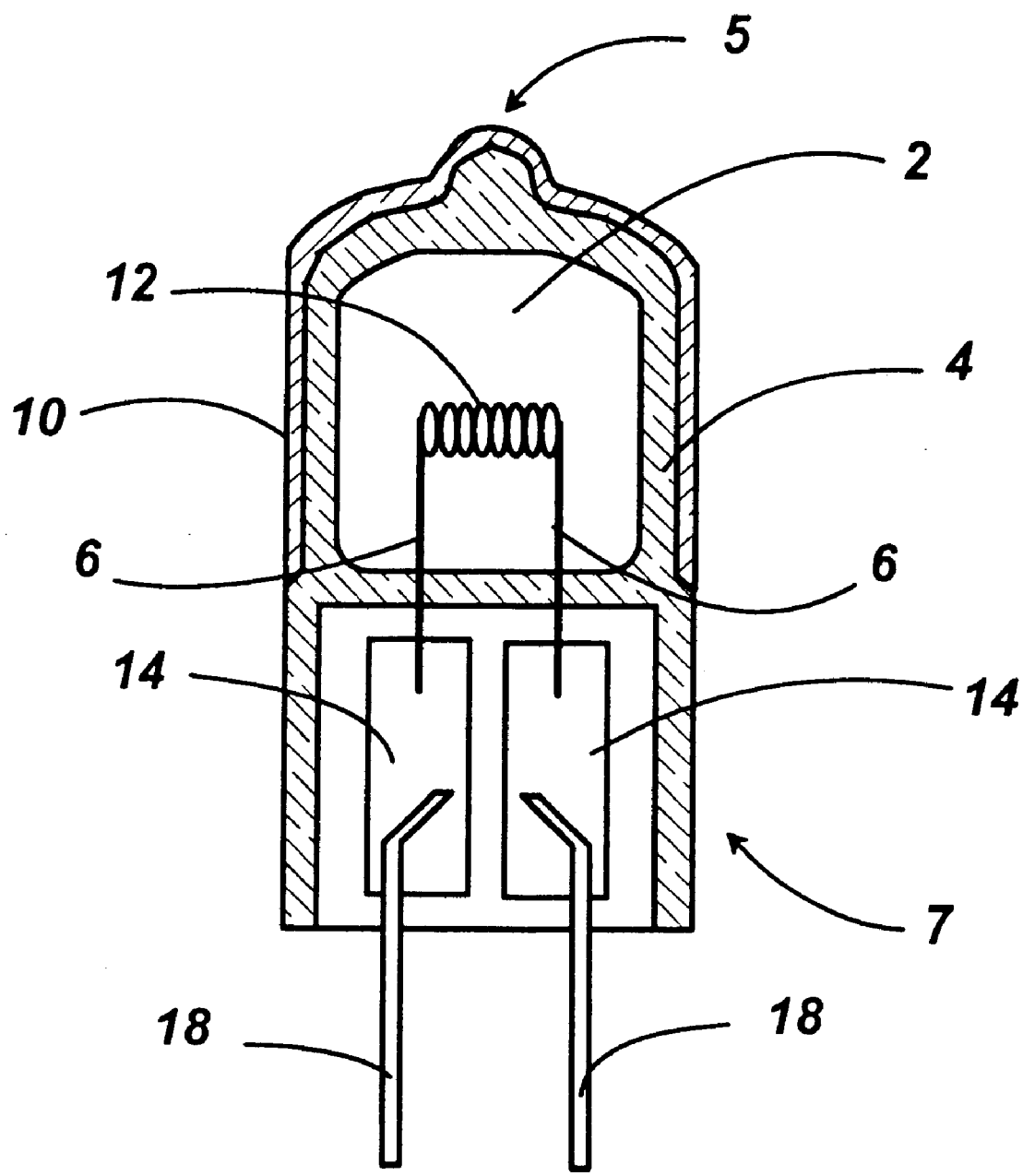
FIG. 1 is a cross sectional illustration of a tungsten halogen lamp having the light diffusing coating of the present invention.

For a better understanding of the present invention, together with other and further objects, advantages and capabilities thereof, reference is made to the following disclosure and appended claims taken in conjunction with the above-described drawings.

The present invention is a light diffusing coating suitable for use on the exterior surface of the glass bulbs of electric lamps including tungsten halogen lamps. Preferably, the coating does not reduce the lumen output of the lamp by more than 10%. More preferably, the coating does not reduce the lumen output by more than 5%.

The light diffusing coating of the present invention contains silica particles that are bonded to each other and to the glass surface with a sol gel derived silica. The sol gel derived silica acts as the glue that provides mechanical strength to the coating and promotes adherence to the glass envelope. Light diffusion is achieved by a bimodal distribution of silica particles. The bimodal distribution was discovered to be necessary to obtain satisfactory coating uniformity and sufficient light diffusing properties. The coating consists of particles of an ultrafine silica having an average diameter of about 10 nm to about 100 nm, and fine silica particles having an average diameter of about 0.5 μm to about 4 μm. The fine silica powder may be crystalline or glassy $SiO_2$. More preferable, the average diameter of the fine silica is about 2 μm; material sources include Alfa AESAR, CERAC, and UNIMIN. The preferred ultrafine silica is AEROSIL OX50 available from Degussa AG. AEROSIL OX50 is a fumed silica having an average diameter of about 40 nm and a 50 $m^2/g$ BET surface area. Use of the ultrafine silica alone without the larger silica particles is insufficient. For example, the sol gel derived light scattering coating described by Hinz et al., *J. Non-Crystalline Solids*, 82 (1986) 411–416, in which only AEROSIL is used produces a matte surface which is not capable of sufficiently reducing the glare from the filament of an incandescent lamp.

The coating is applied by dip coating or spray coating a coating solution onto the exterior surface of the bulb. After drying, the coating is first fired under oxidizing conditions to decarburize the coating (firing temperature: 500–600° C.), and then sintered at elevated temperatures (i.e. up to 1000° C.) to high strength. The firing process can be achieved by flame firing with an oxidizing gas mix, firing in a conventional furnace, or a combination of both. The coating solution is composed of fine and ultrafine silica particles suspended in an alcoholic solution of two silicon alkoxide compounds, tetraethoxysilane (TEOS, $Si(OC_2H_5)_4$) and diethoxydimethylsilane (DEODMS, $(CH_3)_2Si(OC_2H_5)_2$). Small amounts of nitric acid are used for pH control.

Preferred ranges for the solution components are 30–40 weight percent (wt. %) ethanol, 10–20 wt. % DI water, 17–23 wt. % fine silica, 2.5–3.5 wt. % ultrafine silica, 15–20 wt. % tetraethoxysilane, and 10–15 wt. % diethoxydimethysilane; nitric acid is added to adjust the pH to 2.1–2.3. A more preferred solution composition is 33 wt. % ethanol, 14 wt. % DI water, 19 wt. % fine silica, 3.1 wt. % ultrafine silica, 18.7 wt. % tetraethoxysilane, and 12.5 wt. % diethoxydimethylsilane. The stability of the coating solution is very sensitive to the water content of the mixture; elevated water contents result in partial gelation of the coating solution. Organic additives, such as polyethylene glycol or hydroxypropyl cellulose, may be added to adjust the viscosity and enhance the stability of the coating solution. The silicon alkoxide components are required for adequate coating strength and coating adherence to the glass envelope. In particular, the silicon alkoxides should comprise from 25 to 35 wt. % of the solution. DEODMS was determined to be essential for decreasing cracking during the drying and firing stages of the coated lamp; the preferred DEODMS/TEOS ratio is 0.67. A high alcohol content was required to stabilize the coating solution. The high alcohol content further resulted in a faster drying time and improved coating uniformity. Although ethanol is preferred, it is believed that other alcohols may be used including methanol or isopropanol.

A typical tungsten halogen lamp having the light diffusing coating of this invention is illustrated in cross section in FIG. 1. The lamp has a high strength, glass envelope 4 which hermetically encloses cavity 2 which contains a halogen-containing fill. Exterior leads 18 are connected to molybdenum foils 14 which in turn are connected to lead wires 6. The molybdenum foils 14 are hermetically sealed within the press seal region 7 of the lamp envelope. Lead wires 6 are connected to filament 12 which is contained within cavity 2. The filament is connected to an external source of electrical energy (not shown) through the conductive paths formed by the lead wires 6, the foils 14, and the exterior leads 18. Light diffusing coating 10 is shown applied to the exterior surface of lamp envelope 4 including tip-off area 5. An advantage of the invention is the ability of the coating to remain adhered to surfaces which present abrupt changes in curvature such as tip-off area 5.

The following non-limiting examples are presented.

EXAMPLE

Figure 2:
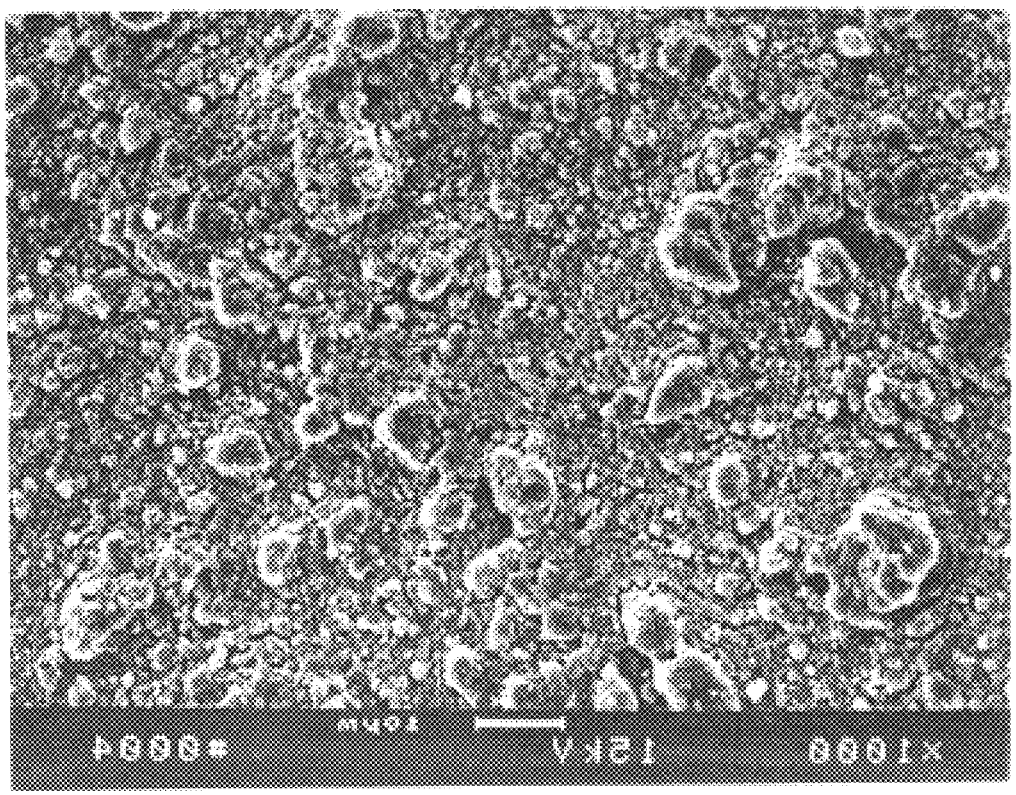
FIG. 2 is an SEM photomicrograph of the light diffusing coating of the present invention.

A sol gel coating solution was formed by combining the following components in the stated proportions: ethanol (26 ml), 0.01N $HNO_3$ (9 ml), tetraethoxysilane ($Si(OC_2H_5)_4$) (12.6 ml)(Alfa AESAR tetraethoxysilane 98%+), diethoxydimethylsilane (($CH_3)_2Si(OC_2H_5)_2$) (8.4 ml) (Aldrich Chemical Company Diethoxydimethylsilane 97%), 2 μm diameter fine silica particles (11.9 g) (Alfa AESAR silicon (IV) oxide —400 mesh), and 40 nm diameter ultrafine silica particles (2.0 g) (AEROSIL OX50, Degussa AG). The pH of the solution was adjusted to 2.1–2.3 with 1.0 N $HNO_3$. Tungsten halogen lamps, 10 W/12V and 50 W/12V, having quartz bulbs were dip coated with the sol gel coating solution. Excess solution was removed from the tip off region of the lamp with a slight vacuum or sponge. The coatings were flame fired with a gas burner (a hydrogen/oxygen or natural gas/oxygen gas mixture was used). An oxidizing flame was required to prevent blackening of the carbon in the coating. Three stages of firing were required: 1) gentle heating to dry the coating (100–200° C.); 2) heating to 500–600° C. to decarburize the coating; and 3) heating to 700–1000° C. to obtain a coating with adequate strength. A scratch test was used to evaluate the coating strength and adherence. Mechanical strength of the coating was excellent. Macroscopically, the coating appeared to be evenly distributed over the bulb surface. Microscopically, as shown in FIG. 2, the light diffusing coating had a uniform dispersion of fine and ultrafine silica scattering centers. The level of light diffusion was varied by adjusting the coating thickness. Lamps prepared with the light diffusing coatings of this invention exhibited light diffusion properties similar to sandblasted lamps. Lumen loss for these lamps was approximately 5%. Lamp life was not influenced by the light diffusing coating.

FIGS. 3A–3D demonstrate the light diffusing properties of the coating on 12V tungsten halogen lamps. FIGS. 3A and 3B show a tungsten halogen lamp without the light diffusing coating. The glare from the operating filament in the uncoated lamp is evident in FIG. 3B. FIGS. 3C and 3D show the effect of adding the light diffusing coating. In FIG. 3C, the filament in the non-operating lamp cannot be seen through the coating. In FIG. 3D, an even, glare-free, illumination is evident in the operating lamp. The "hot spot" from the filament has been eliminated.

While there has been shown and described what are at the present considered the preferred embodiments of the invention, it will be obvious to those skilled in the art that various changes and modifications may be made therein without departing from the scope of the invention as defined by the appended claims.

I claim:

1. A light diffusing coating for an electric lamp having a glass bulb, the coating consisting of: fine silica particles having an average diameter of from about 0.5 to about 4 micrometers and ultrafine silica particles having an average diameter of from about 10 to about 100 nanometers; the fine and ultrafine silica particles being adhered to the glass bulb by a sol gel derived silica.

2. The coating of claim 1 wherein the average diameter of the fine silica particles is about 2 micrometers and the average diameter of the ultrafine silica particles is about 40 nanometers.

3. The coating of claim 1 wherein the coating does not reduce the lumen output of the electric lamp by more than 10%.

4. The coating of claim 1 wherein the coating does not reduce the lumen output of the electric lamp by more than 5%.

5. The coating of claim 1 wherein the coating is formed from an alcoholic solution of tetraethoxysilane and diethoxydimethylsilane.

6. A sol gel coating solution for forming a light diffusing coating on an electric lamp, the sol gel coating solution consisting of: fine silica particles having an average diameter of from about 0.5 to about 4 micrometers and ultrafine silica particles having an average diameter of from about 10 to about 100 nanometers, said silica particles being suspended in an alcoholic solution of tetraethoxysiliane and diethoxydimethylsilane.

7. The coating solution of claim 6 wherein the tetraethoxysilane and diethoxydimethylsilane comprise from 25 to 35 weight percent of the solution.

8. The coating solution of claim 6 wherein the ratio of diethoxydimethylsilane to tetraethoxysilane is 0.67.

9. The coating solution of claim 6 comprising 30–40 wt. % ethanol, 10–20 wt. % water, 17–23 wt. % fine silica, 2.5–3.5 wt. % ultrafine silica, 15–20 wt. % tetraethoxysilane, and 10–15 wt. % diethoxydimethysilane.

10. The coating solution of claim 6 comprising 33 wt. % ethanol, 14 wt. % water, 19 wt. % fine silica, 3.1 wt. % ultrafine silica, 18.7 wt. % tetraethoxysilane, and 12.5 wt. % diethoxydimethylsilane.

11. The coating solution of claim 9 wherein nitric acid is added to adjust the pH to 2.1–2.3.

12. The coating solution of claim 10 wherein nitric acid is added to adjust the pH to 2.1–2.3.

13. The coating solution of claim 6 wherein ethanol, methanol or isopropanol are used to form the alcoholic solution.

14. The coating solution of claim 6 wherein the solution further contains polyethylene glycol or hydroxypropyl cellulose.

15. An electric lamp having a filament, lead wires, and a glass envelope; the glass envelope containing the filament and having a light diffusing coating on an exterior surface; the filament being connected to the lead wires and connectable to an external source of electrical energy; the light diffusing coating consisting of: fine silica particles having an average diameter of from about 0.5 to about 4 micrometers and ultrafine silica particles having an average diameter of from about 10 to about 100 nanometers; the fine and ultrafine silica particles being adhered to the glass envelope by a sol gel derived silica.

16. The electric lamp of claim 15 wherein the average diameter of the fine silica particles is about 2 micrometers and the average diameter of the ultrafine silica particles is about 40 nanometers.

17. The electric lamp of claim 15 wherein the coating does not reduce the lumen output of the electric lamp by more than 10%.

18. The electric lamp of claim 15 wherein the coating does not reduce the lumen output of the electric lamp by more than 5%.

19. The electric lamp of claim 15 wherein the envelope further contains a halogen-containing fill.

20. The electric lamp of claim 19 wherein the average diameter of the fine silica particles is about 2 micrometers and the average diameter of the ultrafine silica particles is about 40 nanometers.

21. The electric lamp of claim 19 wherein the coating does not reduce the lumen output of the electric lamp by more than 10%.

22. The electric lamp of claim 19 wherein the coating does not reduce the lumen output of the electric lamp by more than 5%.

23. A method of making a light diffusing coating on an electric lamp having a glass envelope comprising:
   (a) applying a sol gel coating solution to the exterior surface of the glass envelope, the coating solution consisting of: fine silica particles having an average diameter of from about 0.5 to about 4 micrometers and ultrafine silica particles having an average diameter of from about 10 to about 100 nanometers, said silica particles being suspended in an alcoholic solution of tetraethoxysiliane and diethoxydimethylsilane;
   (b) drying the coating solution on the exterior surface at a temperature from 100 to 200° C. to form a dried coating;
   (c) decarburizing the dried coating at a temperature from 500 to 600° C.; and
   (d) sintering the dried coating at a temperature from 700 to 1000° C. to form the light diffusing coating.

24. The coating of claim 1 wherein the ratio of fine silica particles to ultrafine silica particles is from 4.9 to 9.2 by weight.

25. The electric lamp of claim 15 wherein the ratio of fine silica particles to ultrafine silica particles is from 4.9 to 9.2 by weight.

* * * * *